(12) United States Patent
Senchuk et al.

(10) Patent No.: US 8,342,109 B2
(45) Date of Patent: Jan. 1, 2013

(54) SPREADER EQUIPPED DELIVERY BOOT FOR USE WITH A SWEEP BLADE ON AN AGRICULTURAL IMPLEMENT

(75) Inventors: Craig Senchuk, Brandon (CA); Donald Arksey, Brandon (CA)

(73) Assignee: Atom Jet Industries (2002) Ltd., Brandon, Manitoba (CA)

( * ) Notice: Subject to any disclaimer, the term of this patent is extended or adjusted under 35 U.S.C. 154(b) by 284 days.

(21) Appl. No.: 12/816,526

(22) Filed: Jun. 16, 2010

(65) Prior Publication Data

US 2011/0168068 A1      Jul. 14, 2011

Related U.S. Application Data

(60) Provisional application No. 61/293,756, filed on Jan. 11, 2010.

(51) Int. Cl.
*A01B 15/00*     (2006.01)
*A01B 39/20*     (2006.01)
*A01C 5/00*      (2006.01)

(52) U.S. Cl. ........ 111/150; 111/152; 172/724; 172/726; 172/762

(58) Field of Classification Search .................. 111/150, 111/130, 149, 133, 8, 118, 119, 124, 7.4, 111/14, 34, 152; 172/724, 726, 762
See application file for complete search history.

(56) References Cited

U.S. PATENT DOCUMENTS 5,983,813 A * 11/1999 Swab et al. .................. 111/150

* cited by examiner

*Primary Examiner* — Christopher J. Novosad
(74) *Attorney, Agent, or Firm* — Kyle R. Satterthwaite; Ryan W. Dupuis; Ade & Company, Inc.

(57) ABSTRACT

A delivery boot for mounting on a shank of an agricultural implement and carrying a sweep blade. The boot features a channel member having front, rear and side walls defining a channel extending downward from an inlet proximate the top end to an outlet proximate the bottom end, a sweep connection element defined on the channel member at a front side and a shank connection element defined on the channel member at a rear side thereof. A spreader is supported on the channel member proximate the outlet thereof to receive product delivered from the inlet through the channel member and guide the product laterally outward to both sides of the outlet. Arranged to mount in front of the shank and behind the sweep, the boot positions the outlet ahead of the shank to minimize disruption of product placement by earth falling back into the furrow behind the shank.

20 Claims, 9 Drawing Sheets

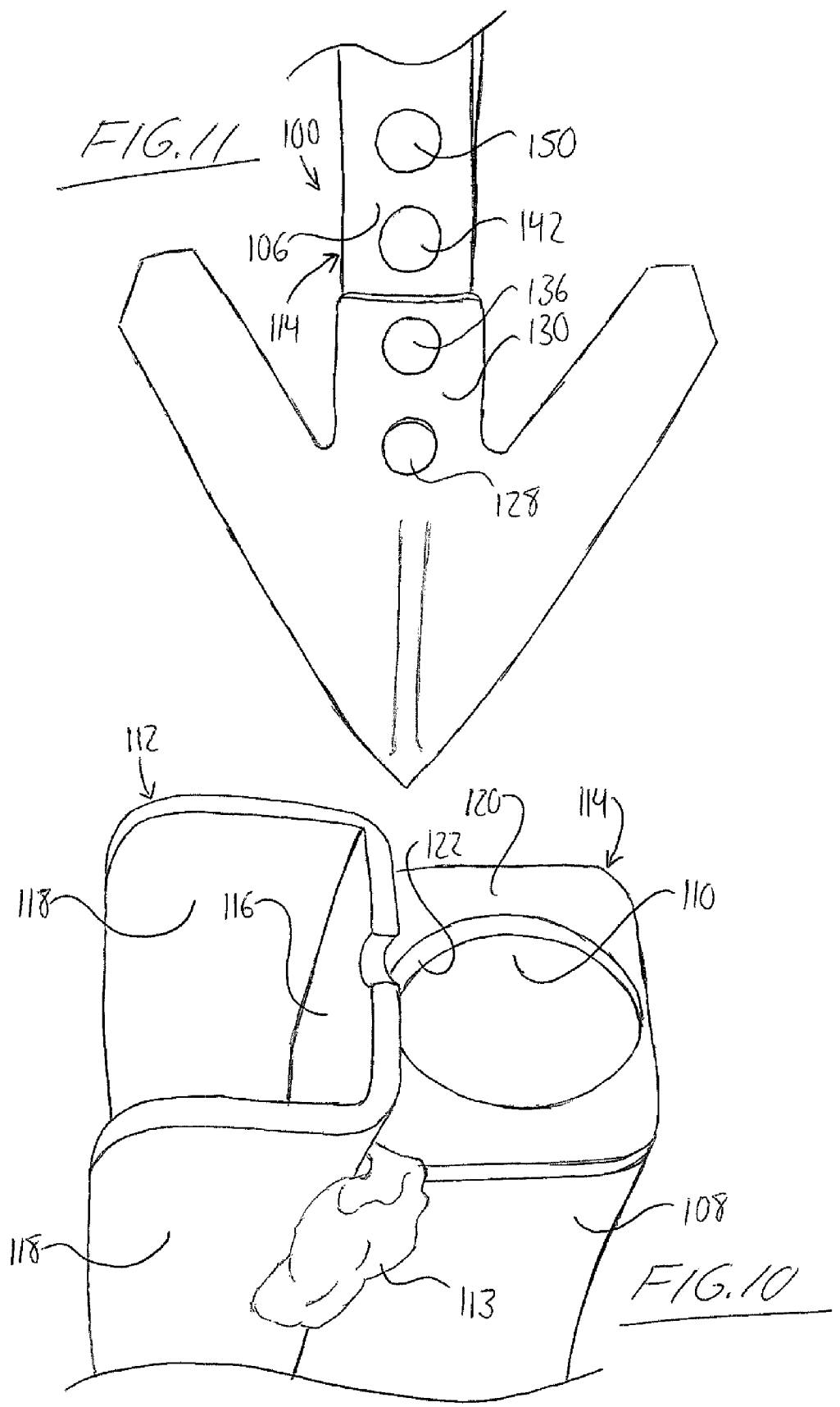

SPREADER EQUIPPED DELIVERY BOOT FOR USE WITH A SWEEP BLADE ON AN AGRICULTURAL IMPLEMENT

FIELD OF THE INVENTION

This invention relates generally to agricultural implements and more particularly to a delivery boot for installation with a sweep blade on a shank of an agricultural implement for opening a furrow in the ground and delivering seed, fertilizer or other product thereto.

BACKGROUND OF THE INVENTION

Agricultural tools or blades called sweeps are generally mounted on downward depending shanks or tines of an agricultural implement pulled along the ground by an agricultural tractor or the like so that the sweeps are pulled through the soil to till the ground by cutting off or uprooting undesirable plants, sowing seeds breaking up the soil, etc. A typical agricultural sweep includes an earth or ground engaging body portion having an arrowhead or triangular-like shape forming a point or nose at the forward end with two symmetrical wing-like bodies sweeping rearward therefrom to define cutting edges at the leading edges of the wings on either side of the point. A stem or mounting portion typically extends upward from the body portion for connection to the shank or tine of the implement on which it is installed.

In addition to use of such sweeps in isolation to carry out purely tilling operations, it is known to use sweeps as part of an opener assembly of an air seeder or drill to carry out the tilling or weed kill function of the sweep while simultaneously delivering seed and/or fertilizer, rearward of the sweep. In such arrangements, the sweep not only cuts through weeds but also forms a furrow in the ground having a firm bottom defining a seed bed beneath the ground surface onto which the seed, fertilizer or other product is to be delivered.

It is known in the prior art to equip a sweep opener with a spreader positioned proximate the outlet of the delivery boot in order to widen the spread of seed or fertilizer across the furrow it is being delivered into, thereby taking advantage of the wider furrow provided by the sweep relative to a more narrow furrow-forming tool, such as a knife opener. An exemplary situation where such a wider seed band is useful is the context of a seeding implement where fertilizer and seed are delivered by separate opener groups positioned on group ahead of the other and the spacing between the seed openers across the machine is different from the spacing between the fertilizer openers across the machine, resulting in seed rows and fertilizer rows coinciding and thus leading to seed burn. For example, in a type of seeding and fertilizing machine used in Russia, where fertilizer sweeps are positioned forward of a dual disc box seeder having of different opener spacing, use of spreader-equipped fertilizer openers would decrease seed burn by reducing the concentration of fertilizer at any one point by spreading each fertilizer row over a greater width.

However, in prior art sweep-style openers, the delivery boot through which the product is delivered into the soil typically trails behind the shank that carries the sweep on the opener or drill implement. As a result, the tendency of the soil displaced by pulling of the opener through the ground to fall back into the so-formed furrow as the shank passes by may have a detrimental effect on consistent placement of the seed or fertilizer product, as the soil falling back into the newly formed furrow may obstruct or interfere with delivery of the product to the seed or fertilizer bed defined at the furrow bottom. Consistent seed and fertilizer placement promotes improved and more consistent crop germination, emergence and yield.

SUMMARY OF THE INVENTION

According to a first aspect of the invention there is provided a delivery boot for mounting on a shank of an agricultural implement and carrying a sweep blade to open a furrow in the ground under driving of the blade through the ground in a forward working direction, the delivery boot comprising:

a channel member having front, rear and side walls defining a channel extending downward from an inlet proximate the top end of the channel member to an outlet proximate the bottom end of the channel member;

a sweep connection element defined on the channel member at a front side thereof facing the forward working direction for cooperation with a corresponding sweep connection element of the sweep blade to facilitate coupling of the sweep blade to the delivery boot;

a shank connection element defined on the channel member at a rear side thereof opposite the front side for cooperation with a corresponding shank connection element of the shank to facilitate coupling of the delivery boot to the shank; and a spreader supported on the channel member proximate the outlet thereof to receive product delivered from the inlet through the channel member and guide said product laterally outward to both sides of the outlet.

Preferably the spreader is positioned below the outlet of the channel to receive product falling therefrom.

The spreader may comprise a base supported at a distance below the outlet and a rim projecting upward from the base, the rim having two halves diverging laterally outward from one another toward the rear side of the channel member.

Preferably the rim is defined by an upturned portion of the base.

Preferably divergence of the rim is provided by a curvature of the rim.

The spreader may be carried on the channel member by a depending support extending downward from the outlet at the rear side of the channel member.

Preferably the depending support is integral with a portion of the rear wall of the channel member.

Preferably the depending support extends less than a full width of the rear wall of the channel.

Preferably a width of the spreader extends laterally outward from the depending support on each side thereof past a respective one of the side walls of the channel.

The spreader preferably has an upper surface diverging downwardly and laterally outward from an apex at a central position across the channel outlet.

Preferably the spreader is defined by a bent plate.

Preferably the upper surface of the spreader is convexly curved.

Preferably the spreader comprises outer wing portions disposed on opposite sides of a central portion defining the apex, the outer wing portions extending laterally outward from connections to the central portion and being oriented at angles less steep than the central portion at the connections.

Preferably the spreader is supported below the outlet of the channel by an extension of the front wall of the channel extending downward from the outlet.

Preferably the sweep connection element is defined on the extension of the front wall of the channel.

Preferably the sweep connection element and shank connection element comprise bolt holes in the front and rear walls of the channel member sufficiently aligned for passage of bolts through the holes in the channel member and corresponding bolt holes in the sweep blade and the shank.

Preferably the shank connection elements are positioned below the inlet of the channel proximate the outlet of the channel.

Preferably the sweep connection elements and shank connection elements are aligned with one another across the channel.

Preferably there are provided side flanges projecting rearward from the channel member proximate the side walls thereof for positioning of the shank between the side flanges.

The side flanges may define parallel legs of a U-shaped cross section of a shank bracket fixed at the rear side of the channel member to embrace opposite sides of the shank.

The shank bracket may define a lower section of the rear wall of the channel.

Preferably the shank bracket defines the shank connection elements.

Preferably a seat defined at the rear side of the channel member for placement against the shank when coupled thereto is configured with different segments from which a user can select one for placement against the shank at a respective position therealong to select a desired height of the boot therealong, each segment being shaped to establish a same orientation of the shank connection element relative to the shank when placed thereagainst at the respective position therealong.

The delivery boot is used in combination with the shank and the sweep blade, the delivery boot being coupled to the shank at a front face thereof and the sweep blade being coupled to the delivery boot at the front side thereof, the spreader of the delivery boot being positioned beneath the sweep blade rearward of a forward point of the sweep blade between diverging wings thereof.

Preferably sections of the channel are arranged end-to-end and oriented along different slopes to generally follow a curvature of the shank.

The front wall of the channel may extend linearly along each of the sections of the channel.

According to a second aspect of the invention, there is provided a furrow opener comprising the above combination of the delivery boot, shank and sweep blade.

BRIEF DESCRIPTION OF THE DRAWINGS

In the accompanying drawings, which illustrate exemplary embodiments of the present invention:

FIG. 10 is a top side perspective view of the delivery boot of FIG. 8.

FIG. 11 is a front overhead view of the deliver boot of FIG. 8 installed on a shank of an agricultural implement and equipped with a sweep blade.

DETAILED DESCRIPTION

Figure 1:
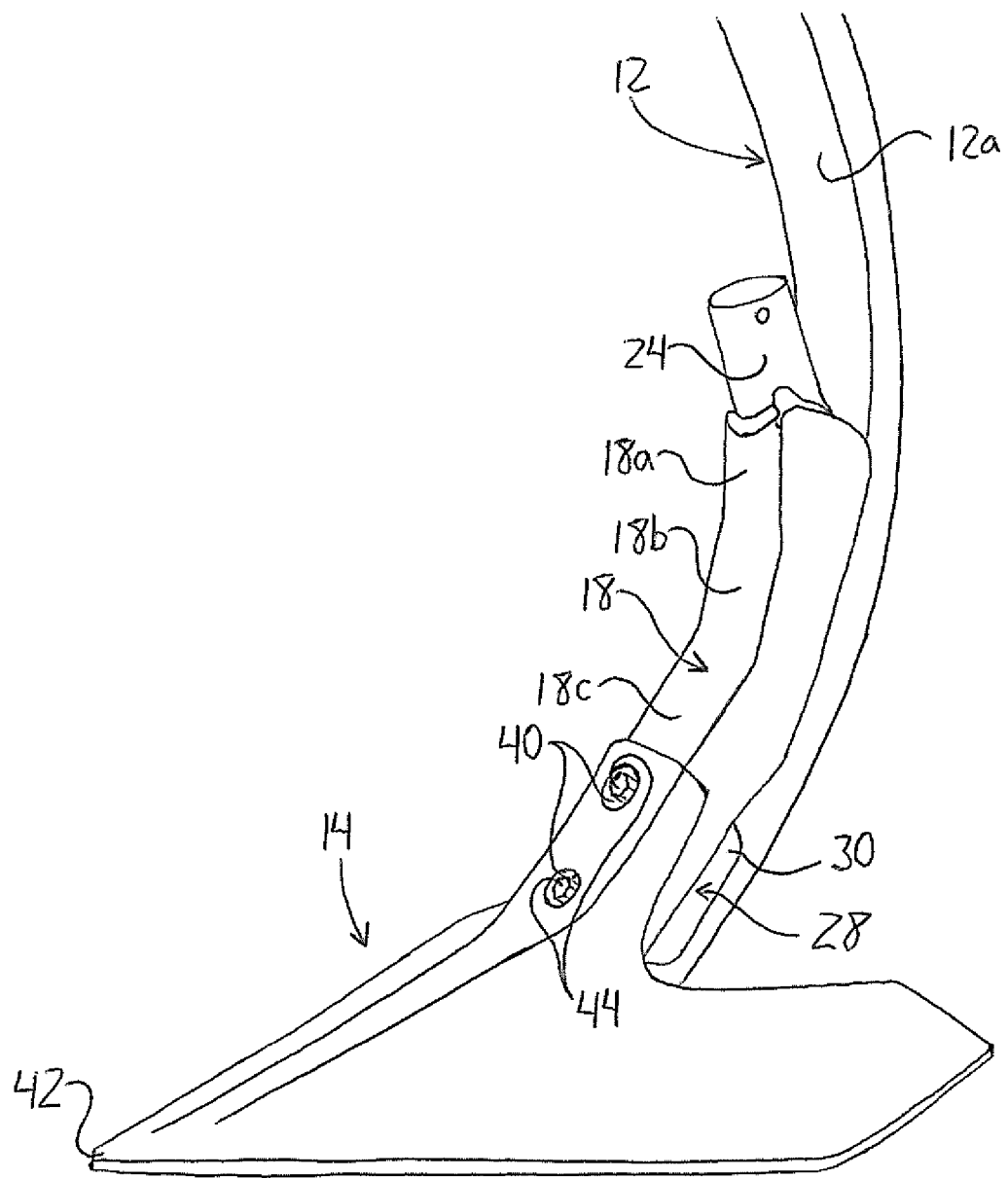
FIG. 1 is a front side perspective view of a first embodiment delivery boot according to the present invention installed on a shank of an agricultural implement and equipped with a sweep blade.
Figure 2:
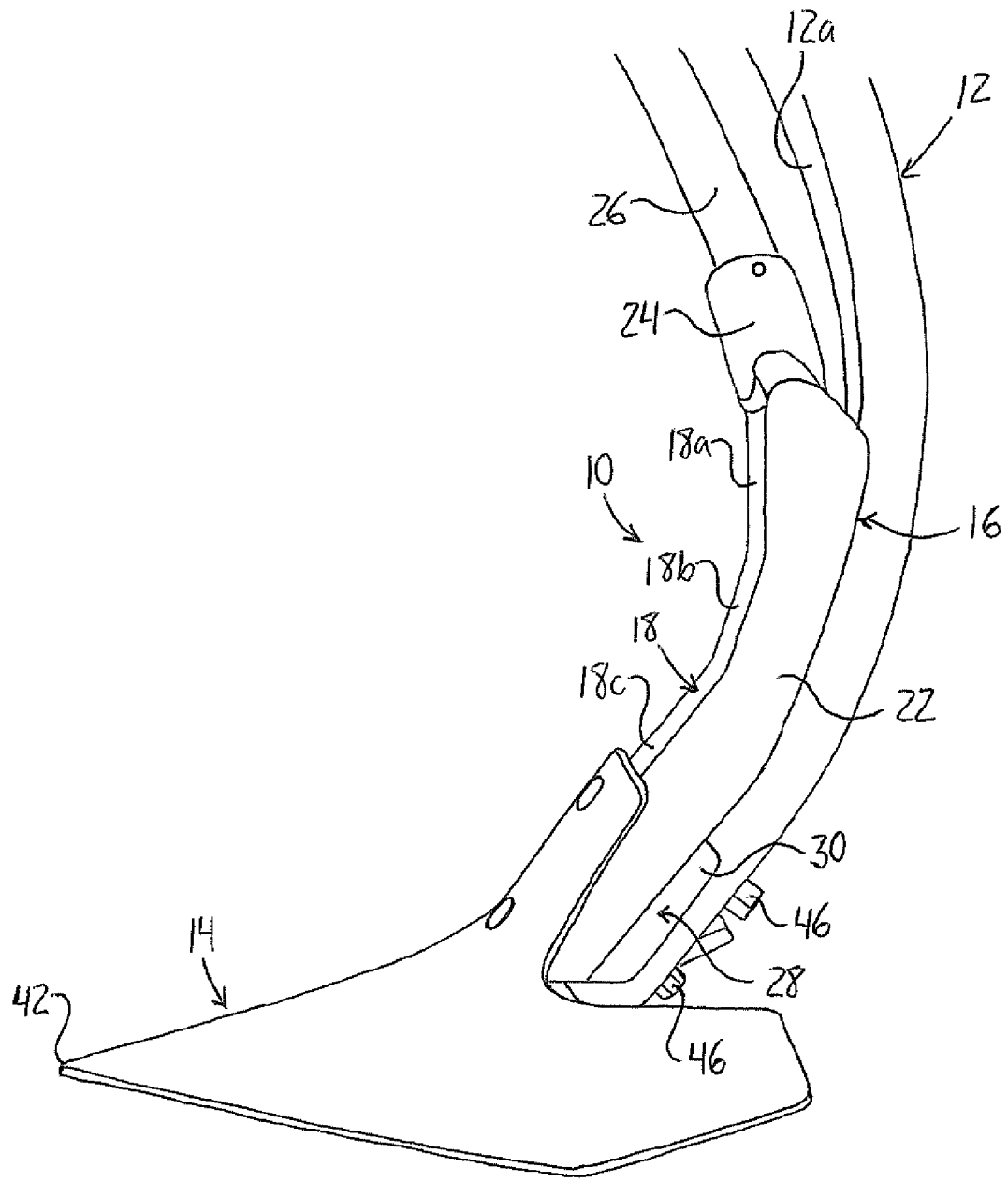
FIG. 2 is a side perspective view of a sweep opener featuring the delivery boot of FIG. 1.

FIG. 1 shows a delivery boot 10 of a first embodiment of the present invention installed on the shank 12 of an agricultural implement. The delivery boot 10 differs from that of conventional sweep openers is that instead of mounting to the rear face of the shank 12 so as not to interfere with the conventional mounting of a sweep on the front face of the shank facing the working direction in which the implement and its openers are to be pulled, the delivery boot 10 is adapted to mount to the front face 12a of the shank 12 and accommodate the conventional sweep 14 on a front face of the delivery boot 10 opposite the shank and facing the forward working direction. The delivery boot 10 requires no modification of the implement's existing shank 12 and no modification of the sweep's conventional mounting features. The positioning of the delivery boot 10 in a position leading the shank 12 in the forward working direction acts situates the product outlet opening at the bottom of the delivery boot forward of the shank beneath the sweep between the diverging wings thereof to better ensure the product is delivered to the bottom of the furrow opened by the sweep before the displaced soil falls back into the furrow behind the sweep.

The delivery boot 10 features a metal channel member 16 closed on four sides by a front wall 18, rear wall 20, and side walls 22 to define an enclosed channel extending downward from an inlet 24 at a top end of the channel member 16 to an outlet 26 at a bottom end of the channel member 16. The channel is rectangular in cross section and divided into three linearly extending sections oriented at oblique angles to one another such that the resulting channel extends generally along a curved path defined by the C-shank 12 to which the delivery boot 10 is mounted. The front wall 18 of the channel member 16 has three planar sections 18a, 18b, 18c arranged end-to-end to close off a front side of the channel opposite the shank 12. The top front wall section 18a adjacent the top end of the channel member 16 extends downward therefrom, with the middle front wall section 18b sloping obliquely downward and forward from the top front wall section 18a. The bottom front wall section 18c extends obliquely downward and forward from the middle front wall section 18b at an angle less steep than the middle front wall section 18b so that the slope of the overall front wall 18 of the channel member increases from section to section moving upward along the channel member. The channel member 16 extends downward along the front face 12a of the C-shank 12 from approximately where the curved shank transitions from extending rearward relative to the implement frame on which it is carried to extending forward relative thereto.

In the first embodiment, the inlet 24 is defined by a short cylindrical metal tube or collar of circular cross section having its lower end fixed directly atop the channel member 16 so that the axial through-bore of the inlet collar communicates with the channel defined by the channel member walls. The connection between the inlet collar 24 and the channel member seals off the transition between the inlet collar's bore the channel of the channel member 16, so that the inlet and channel define a single enclosed passage from the top end of the inlet collar 24 to the bottom of the channel member 16. In the first embodiment, the axis of the inlet collar 24 slopes obliquely upward and forward relative to the plane of the top front wall section 18*a* of the channel member 16 so that the inlet collar 24 tilts forward from the upper end of the channel member 16 generally along the slope of the curved C-shank 12 above the channel member 16 so that passage of the delivery hose end into the inlet collar 24 is not obstructed by the shank 12. The inlet collar 24 is dimensioned to have the end of a delivery hose 26 of a pneumatic product delivery system of the agricultural implement received in its upper end, to facilitate delivery of seed, fertilizer or other granular material into the delivery boot 10 for passage down the channel into the furrow formed by the conventional sweep 14 during use of the opener. The top front wall section 18*a* is oriented to extend slightly away from the shank 12 toward the channel member's top end so that the top section of the channel widens theretoward to enlarge the opening at the top end of the channel member in which the bottom end of the inlet collar 24 is received. The delivery hose 26 and the inlet collar 24 may be coupled together by means of any known or suitable manner to prevent inadvertent separation of the hose 26 from the delivery boot 10. Other fastening arrangements and inlet types known for connection of a seed, fertilizer or other delivery tube to a delivery boot of an opener may alternatively be used with the delivery boot of the present invention.

Figure 5:
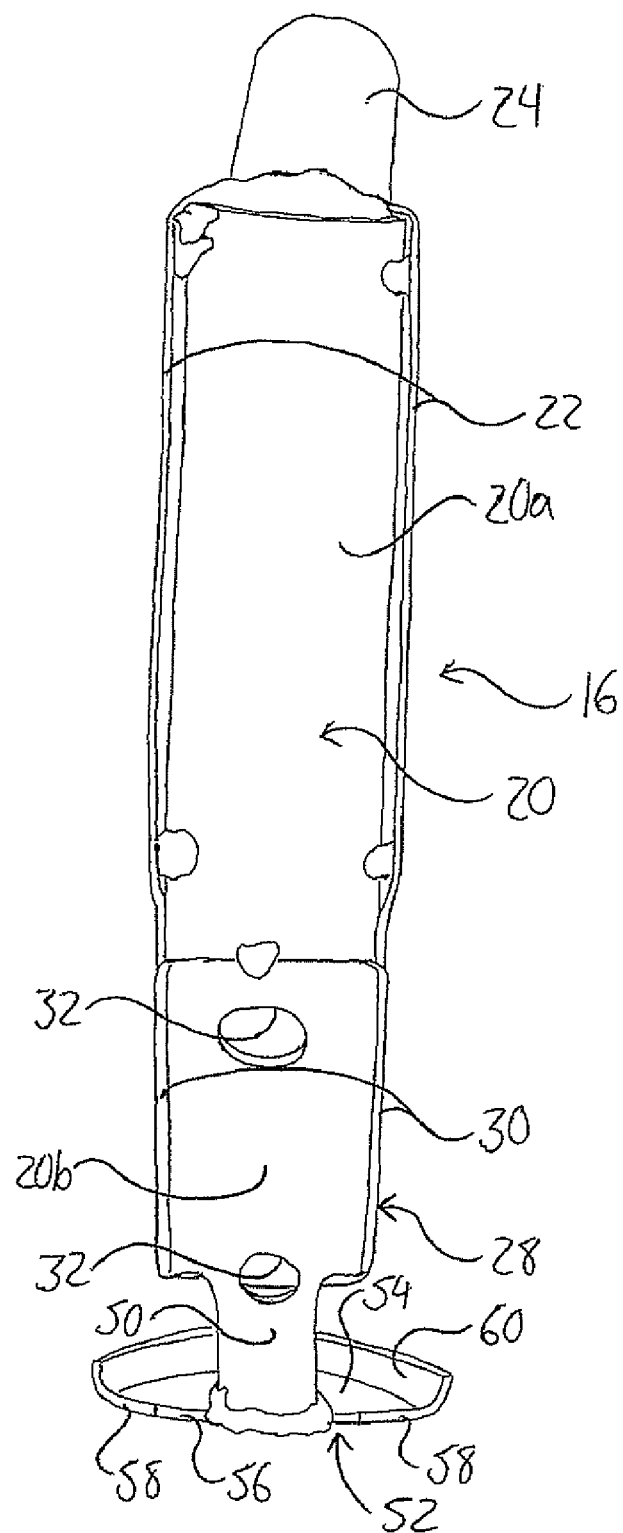
FIG. 5 is a rear elevational view of the delivery boot of FIG. 1.
Figure 6:
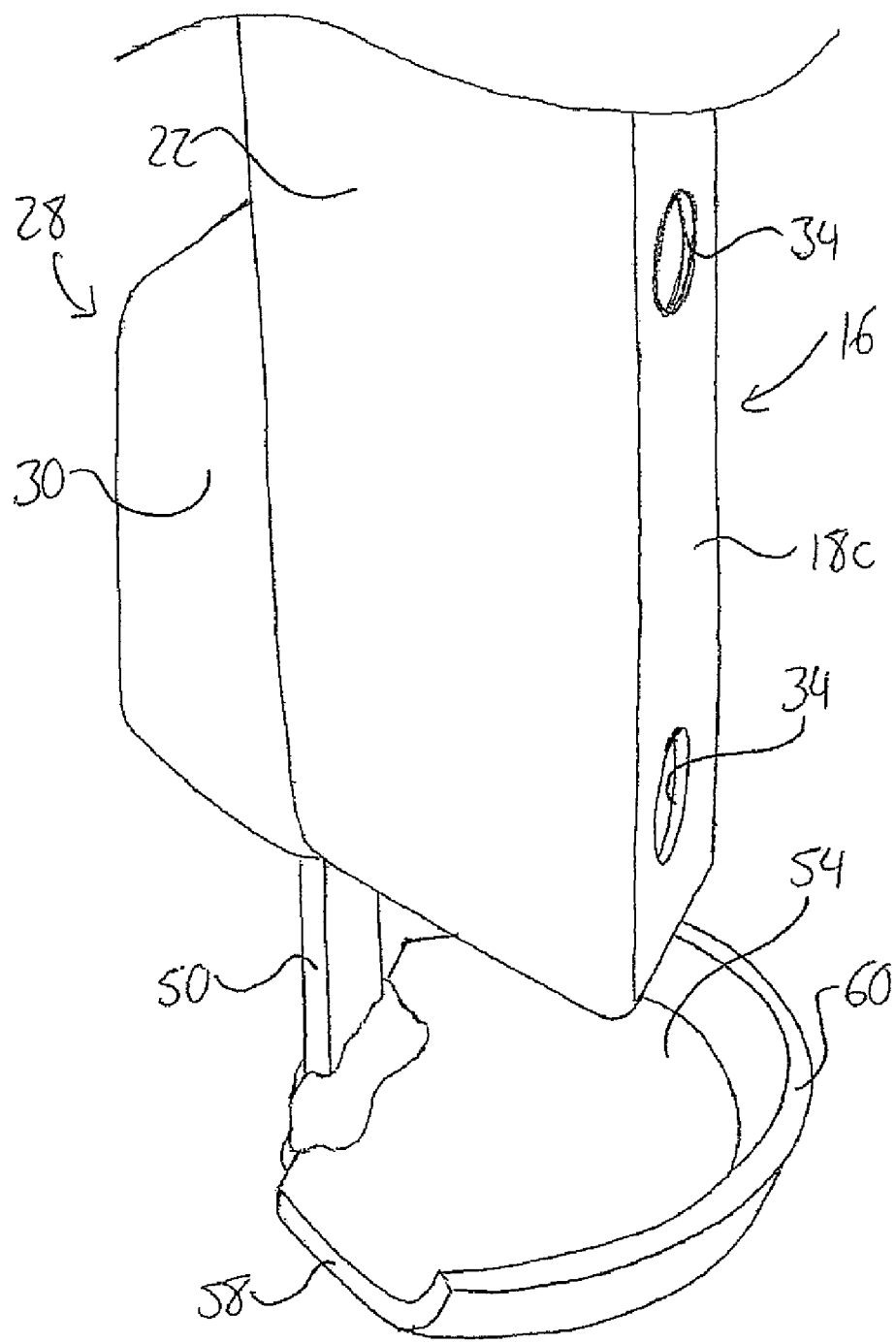
FIG. 6 is a partial front side elevational view of the delivery boot of FIG. 1, showing a bottom end thereof.
Figure 7:
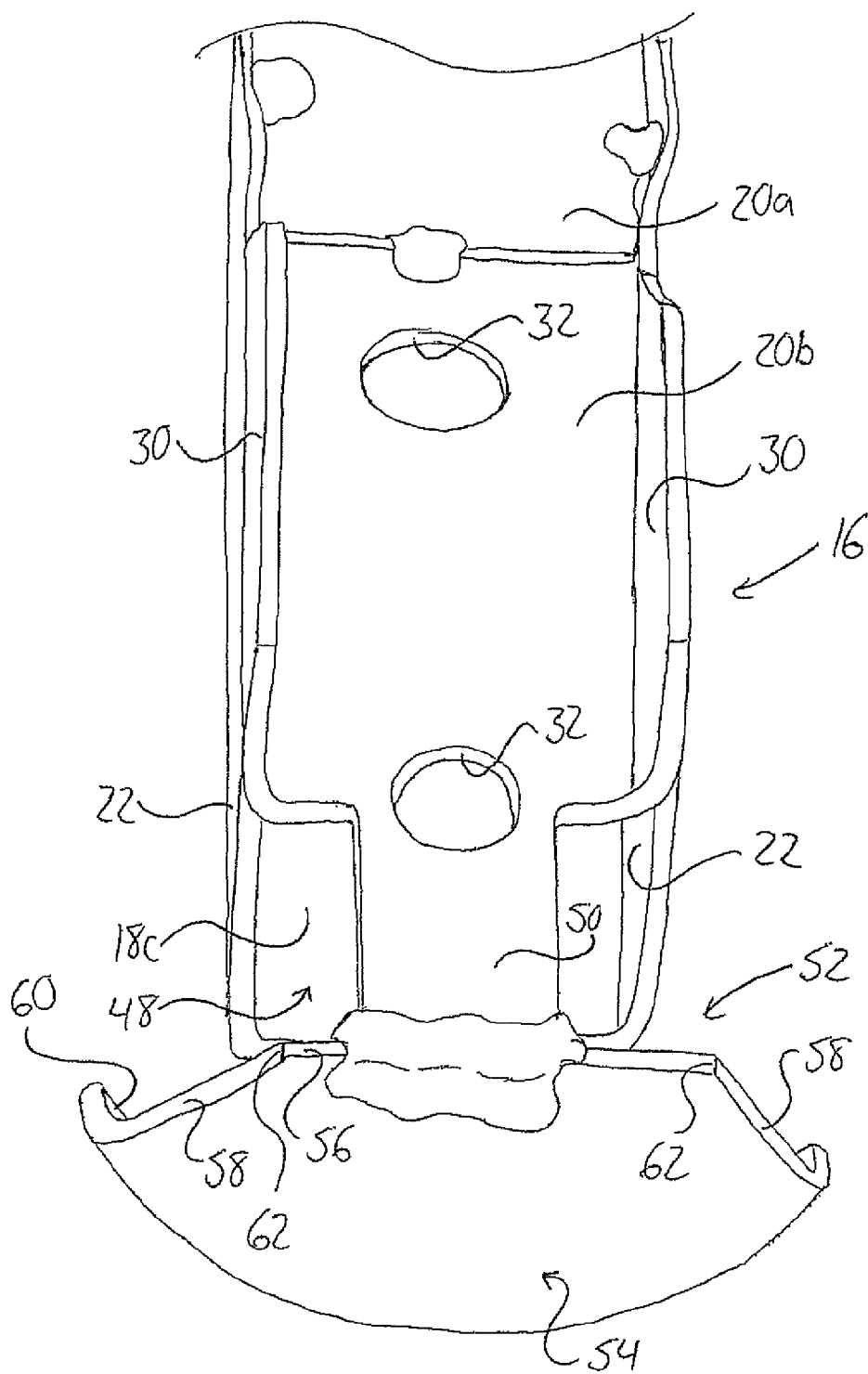
FIG. 7 is a partial bottom rear perspective view of the delivery boot of FIG. 1, showing a bottom end thereof.
Figure 9:
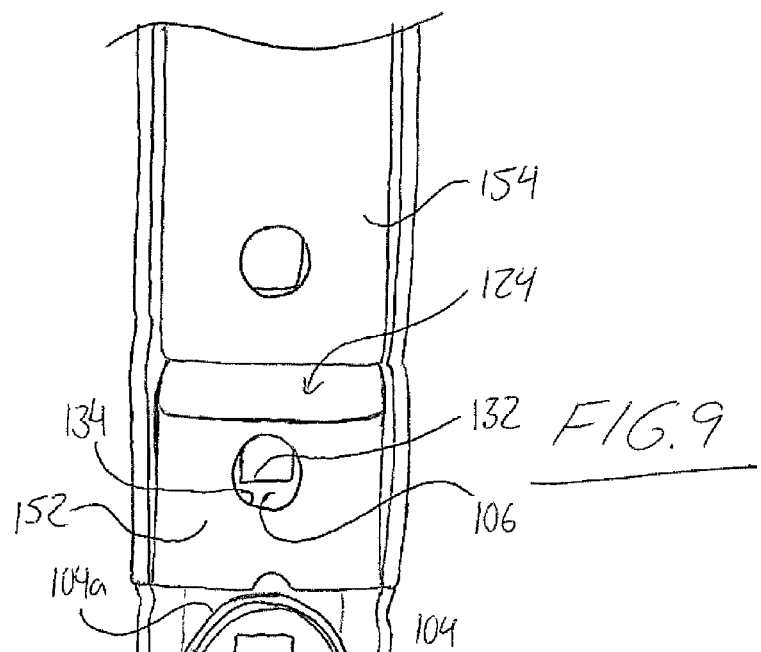
FIG. 9 is a partial rear elevational view of the delivery boot of FIG. 8 showing a close up of a bottom outlet end thereof.
Figure 8:
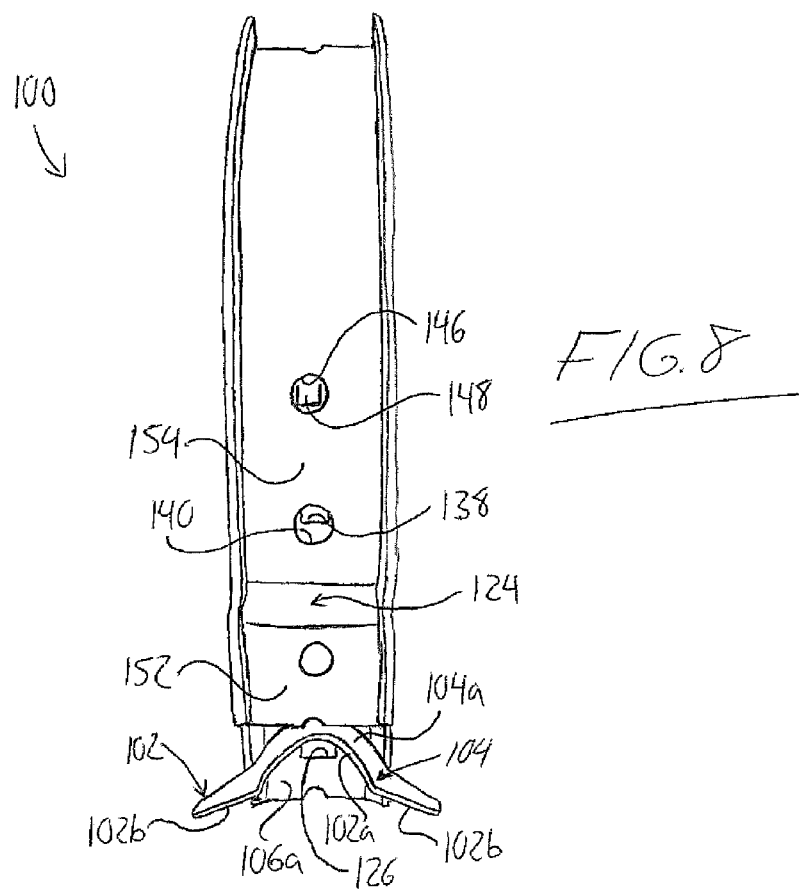
FIG. 8 is a rear elevational view of a second embodiment delivery boot according to the present invention.

FIG. 5 shows a rear view of the delivery boot 10. The rear wall 20 of the channel member 16 is formed in sections, but not in three planar sections like the front wall 18. Instead, the rear wall 20 has two interconnected sections. A top rear wall section 20*a* spans downward from the top end of the channel member 16 at the connection to the inlet collar 24 past the top two front wall sections 18*a*, 18*b* to part way down the bottom front wall section 18*c*. The top rear wall section 20*a* is not planar, instead being smoothly curved along the channel length to generally match the curve of the shank 12 at the portion thereof adjacent which the top rear wall section 20*a* is disposed when the delivery boot 10 is installed. A planar bottom rear wall section 20*b* extends from the bottom end of the top rear wall section 20*a* downward to the bottom of the channel member 16 and is generally parallel to the bottom front wall section 18*c*. This bottom rear wall section 20*b* is defined by a central span of a shank bracket 28.

The shank bracket 28 is generally U-shaped in cross section, having side flanges 30 projecting generally perpendicularly from the bottom rear wall section 20*b* on opposite sides thereof. The side flanges 30 project away from the channel member and are each generally parallel and coplanar with a respective one of the channel member side walls 22 extending between the front and rear walls 18, 20 of the channel member along the full length thereof. The width of the central span of the shank bracket 28 defining the bottom rear wall section 20*b* is equal to or slightly greater than the width of the shank's front face 12*a* so that during installation of the delivery boot 10, the bottom rear wall portion 20*b* of the channel member is placed against the front face 12*a* of the shank 12 at a mounting portion thereof slightly above the shank's bottom end, thereby causing the shank bracket 28 to embrace around the front face of the shank 12*a* where the sweep of a conventional sweep opener would usually be installed, the bottom rear wall section 20*b* having its opposite ends disposed against the shank's curved front face 12 and the side flanges 30 extending along the opposite side edges of the C-shank 12 toward the opposite rear face of the shank.

Figure 4:
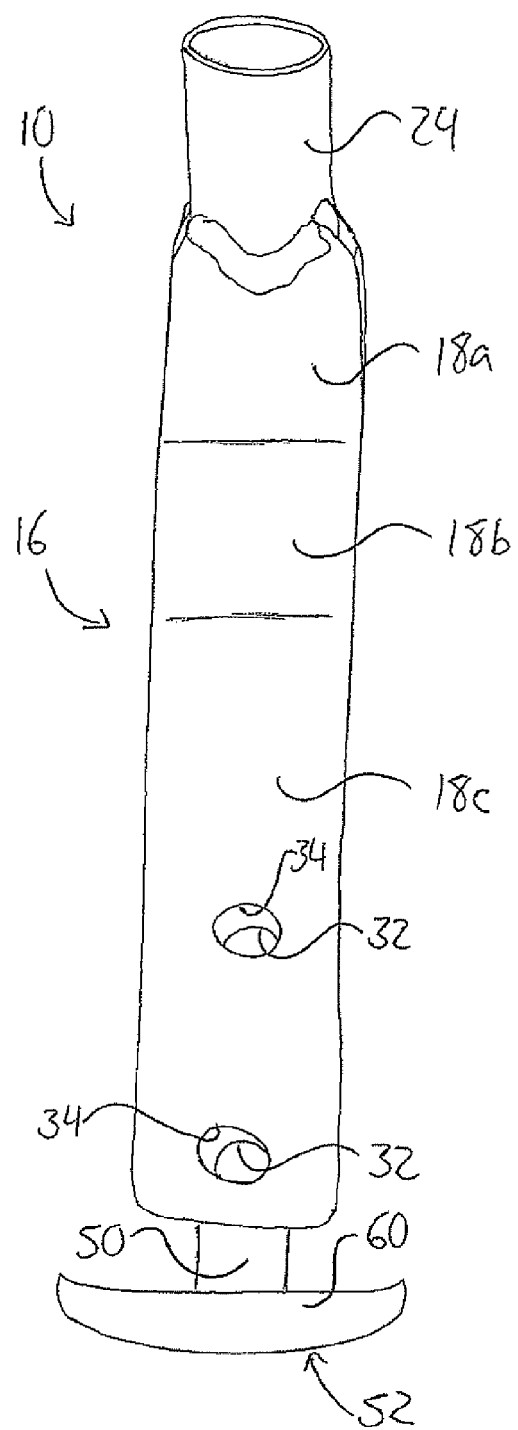
FIG. 4 is a front elevational view of the delivery boot of FIG. 1.

In the central span of the shank bracket 28 that interconnects the side flanges 30 thereof and defines the bottom rear wall section 20*b* of the channel member 16, there are provided two spaced apart bolt holes 32 positioned one above the other along the bottom section of the channel. The distance by which these bolt holes 32 are spaced apart corresponds to the spacing between the original bolt holes of the C-shank that would conventionally be used to bolt the sweep directly to the shank 12. With reference to FIG. 4, a pair of matching bolt holes 34 is provided in the bottom front wall section 18*c* of the channel member, each of these bolt holes 34 being axially aligned with a respective one of the bolt holes 32 in the bottom rear wall section 20*b* across the channel interior of the channel member. As a result, the existing bolt holes of the C-shank and existing bolt holes of the conventional sweep blade 14 originally intended for direct mounting on the C-shank can be used to mount the delivery boot 10 of the present invention and the conventional sweep 14 to the shank 12 in a sandwiched configuration clamping the delivery boot 10 between the sweep 14 and the shank 12. The mounting stem 38 of the sweep 14 having the sweep's bolt holes 40 therein has its rear face opposite the sweep's point 42 placed against the bottom front wall section 18*c* of the channel member 16 with the sweep's bolt holes 40 aligned with the bolt holes of the delivery boot, and the delivery boot 10 in turn has its bottom rear wall section 20*b* placed against the front face 12*a* of the shank to align the delivery boot's bolt holes with the bolt holes of the shank 12. A bolt 44 is passed through each set of axially aligned holes from the sweep side and has a nut 46 fixed to its free end behind the shank 12 to secure the sweep 14 and the delivery boot 10 thereto, much in the same way a conventional sweep is mounted to a shank, except with the delivery boot of the present invention mounted between them.

Bottom edges of the front, side and rear walls of the channel member delimit a generally rectangular outlet opening 48 at the bottom of the channel member 16. A planar support extension 50 depends downward from the bottom end of the channel member from, and parallel to, the rear wall thereof at the outlet opening 48 to support a spreader 52 therebeneath. The spreader consists of a base plate 54 projecting generally perpendicularly from the support extension 50 in the forward working direction. The base plate has a straight rear edge 56 at which it is fixed to the support 50, this rear edge being parallel to the plane of the support 50 an extending laterally therebeyond on each side thereof. Side edges 58 of the of the base plate 54 extend obliquely forward and laterally outward from the rear edge 56. The front of the base plate 54 is bent or curved to extend generally perpendicularly upward from the base plate 54, this upturned front portion of the base plate 54 presenting a rim, lip or ridge 60 curving arcuately between and thereby interconnecting the two side edges 58 of the base plate 54. The spreader is symmetric about a central vertical plane parallel to the forward working direction in which the opener is pulled during use and cutting centrally through the channel from the back wall to the front wall of the channel member. The rim thus has two diverging halves extending away from one another from the forwardmost point of the spreader in a rearward direction opposite the forward working direction along the planar spreader base 54. It will be appreciated that the rim and base may be formed by originally distinct and separate pieces fastened together, for example by welding, as an alternative to the first embodiment integral spreader where the rim is formed by an upturned edge portion of the otherwise planar base.

Figure 3:
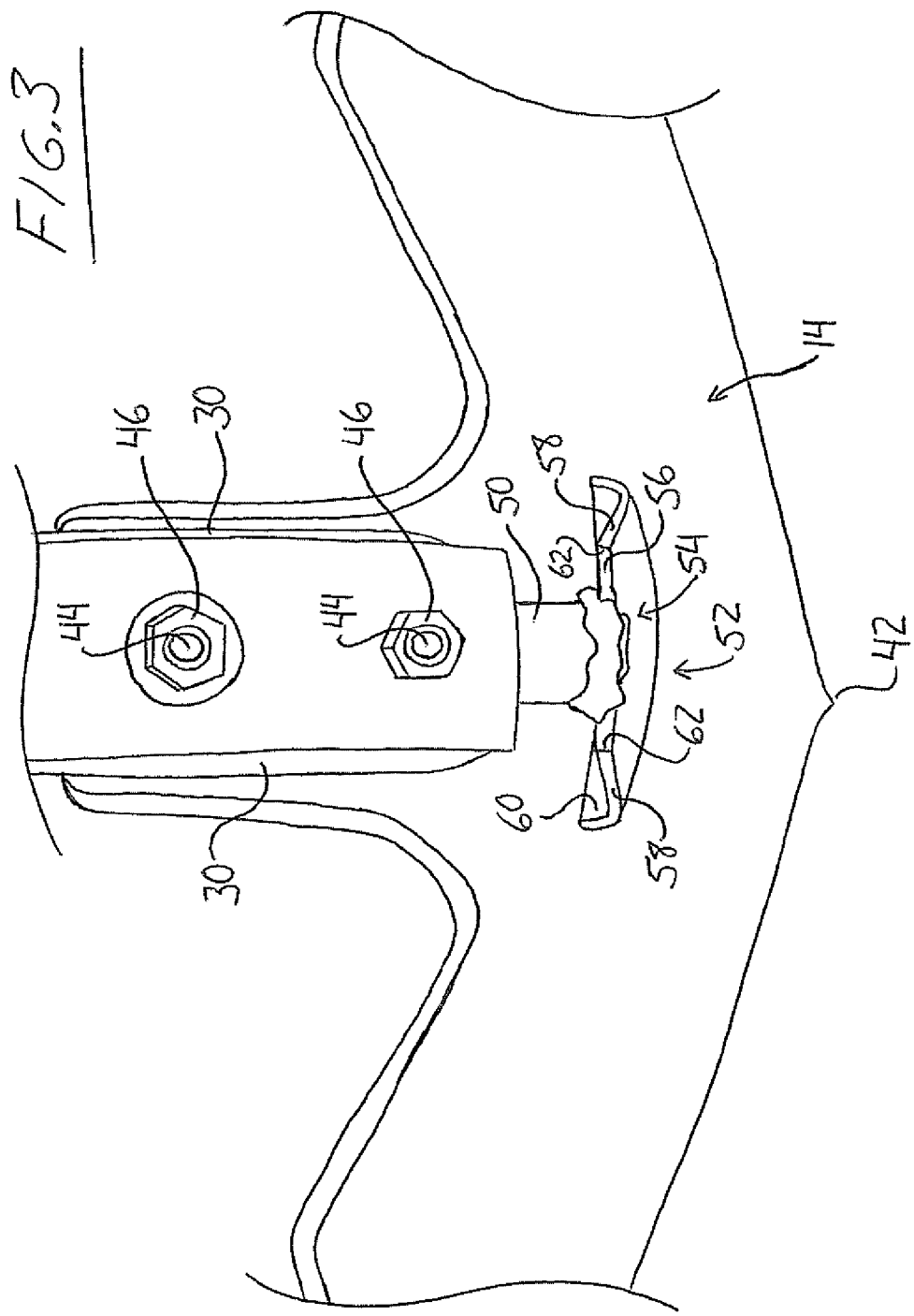
FIG. 3 is a partial bottom rear perspective view of the sweep opener of FIG. 2.

The corners 62 defined between the rear edge 56 of the base plate 54 and the side edges 58 thereof generally align with the meeting of the side walls 22 of the channel member 16 with the bottom rear wall section 20*b* thereof, the divergence of the base plate side edges 58 outward from the rear base plate edge 56 thus extending the width of the base plate 54 beyond that of the channel outlet 48 at the bottom of the channel member. The curving of the rim 60 along its length at the front of the spreader is such that the entire rim 60 lies outside the channel outlet 48. That is, the rim 60 would not pass through a rectangular area bound by imaginary extension of the planar side walls 22 and planar bottom front and rear wall sections 18c, 20b to the base plate 54, the rim instead passing only in front of and laterally outward of such an area. With reference to FIG. 3, the channel outlet 48 and the spreader 52 are positioned beneath the sweep 14 between the wings 64 thereof with the spreader situated slightly forward of the shank so that the discharge of the seed, fertilizer or other product from the channel outlet 48 and any deflection or redirection provided by the spreader occurs under cover of the sweep ahead of the shank to minimize interference with the delivery of the granular product to the furrow bottom by soil displaced by the sweep and falling back into the furrow therebehind.

The support extension 50 has a width less than the bottom rear wall section 20b from which it depends. This way, product falling rearward from the deflector 52 is not limited to release at positions completely laterally outward from the channel outlet 48, so that spread of the product released includes product dispersed near the lateral center of the opener so that there is not a significant completely empty void or separation between product released on the opposite sides of the support 50.

Boot and opener embodiments may feature integral boot front and side walls, with the inlet collar 24, top rear wall section 20a and shank bracket 28 welded thereto. In the prototypes of the first embodiment, the support extension 50 is an integral extension of the central span of the shank bracket that defines the bottom rear wall section, the spreader 52 being welded to the support 50 at the bottom end thereof. Along the top two front wall sections 18a, 18b of the prototype, the side walls 22 project slightly past the top rear wall section 20a so as to extend slightly past the front face 12a of the shank and thereby embrace the shank, similar to, but to less of an extent as, the side flanges 30 of the shank bracket 28. It will be appreciated that other methods of manufacture may alternatively be applied to form the channel member and spreader with the front and rear side mounting elements cooperable with the conventional sweep and shank.

It will be appreciated that deflecting or spreading members of configuration other than the first embodiment flat-plate configuration may be employed to redirect falling seed laterally outward from the channel outlet, as demonstrated by the second embodiment delivery boot of FIGS. 8 to 11.

In the second embodiment boot 100, the flat base plate of the first embodiment is replaced with a member 102 presenting a non-planar bent or curved upper surface 104 that the falling seed deflects from or falls along to areas laterally outside the channel outlet. The illustrated member 102 is in the form of a bent plate presenting a curved central portion 102a disposed immediately beneath the channel outlet and presenting a convex upper face 104a facing upward into the channel, the uppermost point or apex of the curve lying at a central position across the channel width and the plate curving downwardly in two diverging halves to positions beneath the opposing sides of the channel at a distance further below the outlet. Each seed exiting the channel falls onto the curved central portion 102a of the plate 102 and is directed laterally outward from beneath the channel to a respective side by contact with the curved central portion 102a of the plate 102. Further directing of the seed may be provided by wing portions 102b projecting laterally and downwardly outward from opposing sides of the central curved portion at angles less steep than the curve of the central portion where the wing's connect thereto. As shown, these wings may be provided by integral planar parts of the bent plate and may narrow along their lengths, i.e. in the direction projecting laterally from the central curved portion, from a from a first width equaling that of the lower end of the central portion where the wing is connected thereto, to a narrower end or tip 102c furthest outward from the central portion 102a in the lateral direction. In this description of the tapered wing structure, the width is referring to the dimension measured in the plane of the wing along the forward direction in which the boot is moved during use of the agricultural implement.

Each part of the bent plate may be flat in forward direction, as best illustrated in FIG. 9, and the plate may again be oriented relative to the channel to tilt downward to the rear when boot is installed on the shank. Instead of being carried by a support piece extending downward from the rear wall of the channel like the deflector of the first embodiment, the bent plate 102 of the second embodiment is fixed in place behind an extension 106a of the channel front wall 106, which depends downward past the channel outlet defined at the bottom ends of the channel sides and rear 108, 110, the bent plate then extending rearward from the front wall extension 106a to lie beneath the channel outlet and extend to or past a position beneath the rear boundary of the outlet so that all seed from the outlet will fall against the plate 102.

The second embodiment features some other structural differences from the first embodiment. Referring to FIG. 10, the side walls 108, 110 of the closed channel through which the granular material is delivered do not extend rearward past the rear wall of the channel to embrace around the shank. Instead, the mounting bracket at the bottom end of the first embodiment delivery boot is replaced with a U-shaped open channel member 112 that extends nearly the full width of the closed delivery channel 114 from the top end thereof down to just above the bent deflector plate 102. With the channel members fixed together, for example by welding 113 at positions along their lengths, the center span 116 of the open channel's U-shape cross section spans the distance between the side walls 108, 110 of the delivery channel 114 to define the rear wall thereof, with the parallel parts of the U-shaped cross section project rearward from this rear wall 116 on opposite sides thereof to define flanges 118 that embrace the opposing sides of the shank like the flanges of the first embodiment's mounting bracket and the projecting side walls of the first embodiment's delivery channel. Still referring to FIG. 10, the inlet collar of the first embodiment is replaced with a flat rectangular plate 120 having a circular through-hole 122 centrally located therein. This through hole defines the inlet of the delivery channel 114, being sized to receipt the lower end of a granular material delivery hose therein, which can be fastened in place, for example using a fastener fed thereinto the wall of the hose via a hole (not visible in the Figures) in the front wall 106 of delivery channel 114 a short distance below the inlet cover plate 120 thereof.

A bottom portion of the U-shaped channel 112 that opens rearwardly from the closed rectangular delivery channel 114 doesn't follow smoothly from a top portion of the open channel 112, instead featuring a bent portion 124 that juts obliquely outwardly away from the front wall 106 before then once again more closely following the shape of the front wall 106, but at a distance further outward therefrom, to where the bottom end of the open channel 112 terminates with the side walls 108, 110 of the closed delivery channel 114 to define the outlet thereof. The depth of the delivery channel is thus increases where its rear wall 106 juts outward in this manner.

(I can't quite make out whether this is correct from the provided photos. Please confirm or correct. If this is correct, what is the reasoning for this?) In the extension 106a of the delivery channel's front wall 106 below the outlet at the bottom of the channel's side and rear walls, a lowermost bolt hole 126 passes through it at a central location thereacross and a height shortly below the apex of the curved central portion 102a of the deflecting plate 102. With reference to FIG. 11, a lowermost one 128 of a number of bolts can thus be passed through a corresponding bolt hole in the mounting stem 130 of the sweep and be fitted with a nut behind the front wall extension 106 beneath the curved central portion 102 of the deflecting plate 102. A second lowest bolt hole 132 is provided in the delivery channel's front wall 106 above the outlet in a position aligning across the delivery channel with a lowest bolt hole 134 in the pushed back portion of the rear wall 116 beneath the jutting portion 124, for receipt of a second lowest bolt 136 through these holes via a corresponding bolt hole in the mounting stem 130 of the sweep to receive a respective nut from behind the rear wall 116. These two lowest bolts thus fasten the sweep securely to the delivery boot 100.

A third lowest bolt hole 138 in the delivery channel's front wall 106 aligns with a second lowest bolt hole 140 in the rear wall 116 above the jutting out portion 124 thereof for receipt of a third lowest bolt 142 through these holes via a corresponding bolt hole in the shank to receive a respective nut from behind the rear wall 116 and thereby fasten the delivery boot 100 to the shank. A third lowest (or highest) bolt hole 146 in the rear wall 116 aligns with a knock out 148 in the front wall 106 above the third highest hole therein to allow selective formation of a fourth hole in the front wall 106 for receipt of another bolt 150 through these holes via another bolt hole in the shank to receive a respective nut from behind the rear wall 116 and thereby further fasten the delivery boot 100 to the shank.

The above described mounting of the boot and sweep in FIG. 11 using four bolts describes a lower of two possible mounting positions of the boot on a shank. This way, a user can select from different heights of the sweep relative to the shank by selecting how far up the shank to mount the boot. For example, it is desirable to mount the sweep lower on shanks that follow in the tracks of a tractor used to convey a towable implement, as the soil in these tracks is compacted by the tractor tires. Mounting the shanks that follow these tires in a lower position better ensures that the granular material deposited beneath these tracks behind the sweep are at the same or similar depth below ground surface as material deposited by other shanks that do not follow or shadow the tractor tires, thereby improving consistency in seed placement for more consistent crop emergence.

In the lower mounting position described above, it is a top portion 154 of the rear wall 116 that is seated in place against the shank, with the lower end of shank terminating just before the jutting out portion 124. As is shown in FIG. 1 for the first embodiment, the sweep is carried in a generally level horizontal orientation with the outer lower edges of the wings diverging rearward in a horizontal plane to form a flat-bottom furrow. However, still referring to FIG. 1, it will be appreciated that with a boot rear wall that closely follows the curve of the shank over the full height of the rear wall, moving the boot and attached sweep further upward or downward on the shank for mounting at a different set of bolt holes therein would begin to tip the sweep out of the desired level horizontal position.

Thus, the second embodiment of FIGS. 8 to 11 uses the jutting portion 124 of the rear wall 116 to reposition a bottom portion 152 of the rear wall, so that mounting of the boot higher up the shank in a next set of bolt holes therein upward from those used in the lower mounting of the boot in FIG. 11, the bottom portion of the shank seats against the bottom portion 152 of the rear wall below the jutting portion 124 instead of against the top portion 154 above the jutting portion. Since the bottom portion 152 of the rear wall 116 below the jutting out portion 124 is situated rearward from where the rear wall 116 would otherwise continue follow the shape of a shank, sliding the boot upward along the shank from the lower mounting position of FIG. 11 slides the jutting out portion 124 up over the lower edge of the shank to seat the bottom portion 152 thereon between the flange at the opposite sides thereof. If the rear wall followed the shank curve over its full height, instead of deviating from this curve at the jutting and bottom portions 124, 152, drawing the boot upward along the shank would draw the bottom end of the boot upward and rearward, thus tipping the point of the sweep downward. The jutting portion and resulting position and angle of the rear wall's bottom portion further rearward from the front wall than the top portion of the rear wall counteracts this, with the bottom portion 152 set at a small oblique angle downward and rearward relative to the front wall 106 across the delivery channel from it and relative to the top portion 154 of the rear wall above it so as to position the front lower end of the front wall extension 106a forward and downward from where it would otherwise sit.

The different segments of the rear wall thus allow the mounting of the boot at different positions along the shank to change the sweep height relative to the shank while maintaining a consistent sweep orientation among these different mounting positions.

In the higher mounting position, three bolts are used to mount the boot and the sweep. A lowermost bolt passes through the lower one of the sweep stem bolt holes and through the lowermost opening 126 at the front of the delivery channel in the front wall extension 106a in the same manner as the lower mounting position described above. The next bolt in the upper hole in the sweep stem not only passes through the second lowest bolt hole 132 in the front of the delivery channel and the lowest bolt hole 134 in the rear wall 116 of the channel, but additionally continues rearward through a bottom bolt hole in the shank. The third bolt passes through the third lowest bolt hole 138 in the front of the delivery channel and the second lowest hole 140 in the rear wall to pass through a next bolt hole in the shank to complete the coupling thereto.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A delivery boot for mounting on a shank of an agricultural implement and carrying a sweep blade to open a furrow in the ground under driving of the blade through the ground in a forward working direction, the delivery boot comprising:
   a channel member having front, rear and side walls defining a channel extending downward from an inlet proximate the top end of the channel member to an outlet proximate the bottom end of the channel member;
   a sweep connection element defined on the channel member at a front side thereof facing the forward working direction for cooperation with a corresponding sweep connection element of the sweep blade to facilitate coupling of the sweep blade to the delivery boot in a position leading the channel member in the forward working direction;

a shank connection element defined on the channel member at a rear side thereof opposite the front side for cooperation with a corresponding shank connection element of the shank to facilitate coupling of the delivery boot to the shank in a position leading the shank in the forward working direction; and a spreader supported on the channel member proximate the outlet thereof for positioning of said spreader at a location leading the shank in the forward working direction to receive product delivered from the inlet through the channel member and guide said product laterally outward to both sides of the outlet at the location leading the shank in the forward working direction.

2. The delivery boot according to claim 1 wherein the spreader is positioned below the outlet of the channel to receive product falling therefrom.

3. The delivery boot according to claim 1 wherein the spreader has an upper surface diverging downwardly and laterally outward from an apex at a central position across the channel outlet.

4. The delivery boot of claim 3 wherein the spreader is defined by a bent plate.

5. The delivery boot of claim 3 wherein the upper surface of the spreader is convexly curved.

6. The delivery boot of claim 3 wherein the spreader comprises outer wing portions disposed on opposite sides of a central portion defining the apex, the outer wing portions extending laterally outward from connections to the central portion and being oriented at angles less steep than the central portion at the connections.

7. The delivery boot of claim 1 wherein the spreader is supported below the outlet of the channel by an extension of the front wall of the channel extending downward from the outlet.

8. The delivery boot of claim 7 wherein the sweep connection element is defined on the extension of the front wall of the channel.

9. The delivery boot according to claim 1 wherein the sweep connection element and shank connection element comprise bolt holes in the front and rear walls of the channel member sufficiently aligned for passage of bolts through the holes in the channel member and corresponding bolt holes in the sweep blade and the shank.

10. The delivery boot according to claim 1 wherein the shank connection elements are positioned below the inlet of the channel proximate the outlet of the channel.

11. The delivery boot according to claim 1 wherein the sweep connection elements and shank connection elements are aligned with one another across the channel.

12. The delivery boot according to claim 1 comprising side flanges projecting rearward from the channel member proximate the side walls thereof for positioning of the shank between the side flanges.

13. The delivery boot according to claim 12 wherein side flanges define parallel legs of a U-shaped cross section of a shank bracket fixed at the rear side of the channel member to embrace opposite sides of the shank.

14. The delivery boot according to claim 13 wherein the shank bracket defines a lower section of the rear wall of the channel.

15. The delivery boot according to claim 13 wherein the shank bracket defines the shank connection elements.

16. The delivery boot according to claim 1 wherein a seat defined at the rear side of the channel member for placement against the shank when coupled thereto is configured with different segments from which a user can select one for placement against the shank at a respective position therealong to select a desired height of the boot therealong, each segment being shaped to establish a same orientation of the shank connection element relative to the shank when placed thereagainst at the respective position therealong.

17. A furrow opener comprising the combination of claim 16.

18. The delivery boot according to claim 1 in combination with the shank and the sweep blade, the delivery boot being coupled to the shank at a front face thereof in the position leading said shank in the forward working direction and the sweep blade being coupled to the delivery boot at the front side thereof in the position leading the channel member in the forward working direction, the spreader of the delivery boot being positioned beneath the sweep blade rearward of a forward point of the sweep blade between diverging wings thereof at the location leading the shank in the forward working direction.

19. The combination according to claim 18 wherein sections of the channel are arranged end-to-end and oriented along different slopes to generally follow a curvature of the shank.

20. The combination according to claim 19 wherein the front wall of the channel extends linearly along each of the sections of the channel.

* * * * *